J. CHESLER.
ALTERNATING CURRENT RECTIFIER AND RECTIFYING SYSTEM.
APPLICATION FILED JULY 24, 1913.

1,182,894. Patented May 16, 1916.
4 SHEETS—SHEET 1.

WITNESSES
J. A. Brophy
William A. Hardy

INVENTOR
Jerry Chesler
BY Dyer & Holden
his ATTORNEYS

J. CHESLER.
ALTERNATING CURRENT RECTIFIER AND RECTIFYING SYSTEM.
APPLICATION FILED JULY 24, 1913.

1,182,894.

Patented May 16, 1916.
4 SHEETS—SHEET 2.

WITNESSES:
J A Brophy
William A. Hardy

INVENTOR
Jerry Chesler
BY Dyer & Holden
his ATTORNEYS

J. CHESLER.
ALTERNATING CURRENT RECTIFIER AND RECTIFYING SYSTEM.
APPLICATION FILED JULY 24, 1913.

1,182,894.

Patented May 16, 1916.
4 SHEETS—SHEET 4.

WITNESSES:

INVENTOR
Jerry Chesler
BY Dyer & Holden
his ATTORNEYS

UNITED STATES PATENT OFFICE.

JERRY CHESLER, OF EAST ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

ALTERNATING-CURRENT RECTIFIER AND RECTIFYING SYSTEM.

1,182,894.  Specification of Letters Patent.   Patented May 16, 1916.

Application filed July 24, 1913. Serial No. 780,860.

*To all whom it may concern:*

Be it known that I, JERRY CHESLER, a subject of the Czar of Russia, and a resident of East Orange, in the county of Essex and State of New Jersey, have invented certain new and useful Improvements in Alternating-Current Rectifiers and Rectifying Systems, of which the following is a description.

My invention relates to alternating current rectifiers and rectifying systems, and more particularly to improved multiple-unit rectifiers, preferably of the type in which vibrating contacts are employed to open and close a circuit or circuits, connected to a source of alternating current and to a direct current translating device or devices in such a manner as to cause the current to pass into the direct current translating device or devices in one direction only.

My invention, while capable of being used for many other purposes, is especially adapted for use in charging storage batteries and for supplying uni-directional current to electro-plating baths.

Where a plurality of separate rectifying units are employed for rectifying an alternating current, these units are almost always more or less "out of phase." If the rectifying units are of the vibrating contact type, this is partly due to the fact that the energizing coils for the different units are of varying resistance, and partly because the condensers, used to compensate for the inductance in the units and the inertia of the movable parts thereof, vary in capacity. For these and other reasons, it is practically impossible to make separate rectifying units which will be alike in action and effect. Consequently, the use of a plurality of such separate rectifying units, which would not be "in phase" for the reasons indicated, would prevent the best results from being secured, as the vibrating contacts thereof would not be actuated to open and close the circuit or circuits, including the battery or other translating device or devices to be supplied with uni-directional current, at the proper times, and, as a result, there would be a considerable loss in efficiency in rectifying the alternating current.

The principal object of my invention is to provide an improved multiple-unit rectifier of such construction that all the units thereof will be "in phase" whereby the above disadvantages will be obviated.

Another object of my invention is to provide a rectifying device of this type which is adapted to be employed in systems for utilizing either only alternate half waves or both half waves of alternating current, and with the contacts of a plurality of units of the rectifying device connected either in parallel, in series, or in series-parallel in each circuit for supplying uni-directional current to a translating device or devices. The parallel connection affords a plurality of current conducting paths through the rectifying device, and a large current carrying capacity is thus secured. The series connection affords a plurality of breaks in series in the units so connected, whereby sparking is reduced and the apparatus is rendered capable of rectifying currents of relatively high voltage. The series-parallel connection combines the advantages of the series and parallel connections.

My invention also consists in improved alternating current rectifying systems, including rectifying devices of the type hereinbefore described, for utilizing either only alternate half waves or both waves of alternating current.

Other objects and features of my invention will be hereinafter more fully described and claimed.

In the drawings which accompany and form part of this specification

Figure 1:
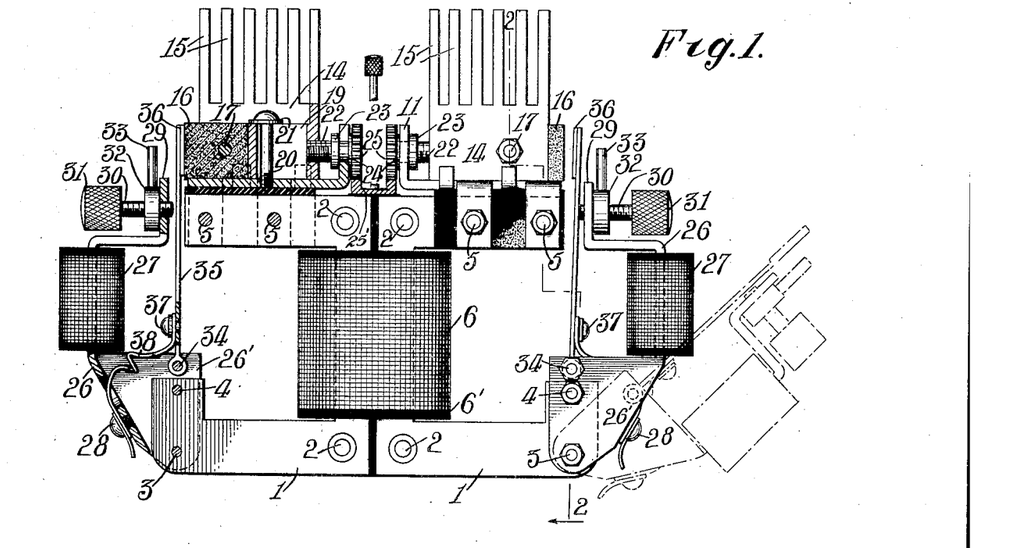
—Figure 1 is a side elevation partly in section of a two-unit rectifier, in accordance with my invention.
Figures 2, 4:
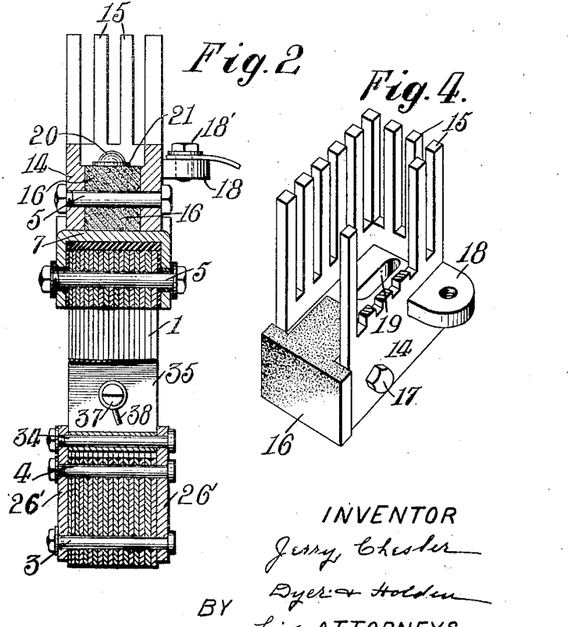
Fig. 2 is a sectional view on the broken line 2—2 of Fig. 1, parts being shown in elevation, and parts being omitted.
Fig. 4 is a perspective view of one of the contact carrying members, partly broken away, with the contact mounted thereon.
Figure 3:
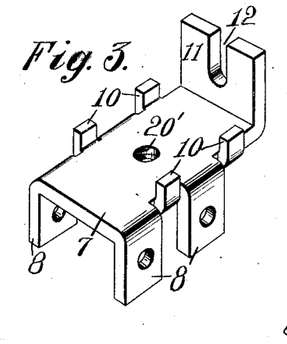
Fig. 3 is a perspective view of a detail of construction.

In the two-unit rectifier shown in Figs. 1 and 2, reference character 1 represents two substantially U-shaped magnetic cores preferably made up of soft iron laminæ secured together in any suitable manner, as by the bolts or screws 2, 3, 4 and 5. The middle portions or bases of the U-shaped cores, which are preferably vertically disposed, are preferably electrically insulated from each other in any suitable manner, and are surrounded by a single energizing coil 6 composed of a number of turns of wire suitably insulated from each other and from the cores 1. The insulation 6', for insulating the coil 6 from the cores 1, is preferably molded on the cores and thus serves as means for holding the cores firmly together, as shown in Fig. 1. It is to be understood, however, that any other suitable means may be employed for fastening cores 1 together, in which case the coil 6 may be loosely disposed about the cores. On the upper horizontal portions or legs of the cores 1, are mounted members 7, preferably of non-magnetic material, such as copper or brass, these members 7 being insulated in any suitable manner from the cores 1. The members 7 have depending portions 8 (see Fig. 3) embracing the upper horizontal portions or legs of the cores 1 and provided with holes through which the screws or bolts 5 are extended, whereby the members 7 are secured in place upon the scores 1, the screws or bolts 5 being suitably insulated from portions 8, as shown in Fig. 2. At one end of each of the members 7, an upturned portion 11 is provided, such portion having a vertically extending slot 12. At the sides of members 7, upturned portions or lugs 10 are provided which serve as guides for preferably rectangular, contact-carrying members 14. Each contact-carrying member 14 is preferably of non-magnetic material, such as copper or brass, and is provided at its sides and one end with upwardly extending comb-like portions 15, which serve to radiate and dissipate the heat produced at the contacts during the operation of the rectifying device, thereby preventing excessive rise of temperature and reducing the tendency to spark. That end of each of the contact carrying members 14 opposite the end provided with a comb-like portion 15, has a recess in which is mounted a contact 16, preferably of carbon or graphite, said contact 16 being secured to the member 14 in engagement with the rear wall of the recess therein, in any suitable manner, as by means of a bolt or screw 17. Contact 16 extends beyond the end of member 14, the extending portion thereof being provided with flanges engaging the adjacent end of member 14. (See Fig. 4).

Reference character 18 represents a projection, formed on each of the members 14, which is provided with a screw threaded hole whereby a conducting wire may be readily connected to said member by means of a binding screw 18'. Each of the members 14 is also provided with a vertically extending slot 19 through which is extended a screw or bolt 20 which is screw-threaded into an opening 20' in the member 7, and the head of which coöperates with a washer 21 to secure the contact carrying member in adjusted position. In order to facilitate the adjustment of the members 14, two members 22 are provided which are respectively screw-threaded into the inner ends of the members 14, and each of which has a cylindrical portion, formed between collars 23 and 24, engaging the slots 12 of members 7. Each of the members 22 is also provided with a pinion 25. A crown gear 25' engages both of the pinions 25, and preferably rests on the upper surfaces of the horizontal upper portions or legs of cores 1 between the upturned portions 11 of members 7. This crown gear is insulated from the cores 1 in any suitable manner. When the crown gear is turned, the engagement thereof with gears 25 will effect the rotation of members 22, and the screw-threaded engagement of the latter with contact carrying members 14 is such that they will thereupon serve to simultaneously adjust such contact carrying members, and thereby contact 16, by moving the same either forward or backward between the guides 10 of members 7, according to the direction in which crown gear 25' is turned. Collars 23 and 24 on members 22 prevent longitudinal movement of these members with respect to members 7. At the end of the lower leg of each of the cores 1, a core member 26 of soft iron, preferably having a magnetic flux capacity much less than that of core 1, is provided. While members 26 may be fixed to or formed integral with cores 1, they are each preferably provided with two vertically extending walls 26' between which the ends of the lower legs of the cores 1 respectively extend, and these members 26 are hingedly mounted upon the bolts or screws 3 so that they may be easily moved into or out of operative position, their operative positions being shown in full lines in Fig. 1 and the inoperative position of one of them in broken lines. The bolts or screws 4 serve as pins to retain the members 26 in operative position. Each of the core members 26 has a portion surrounded by a coil 27, said coil consisting of a number of turns of wire suitably insulated from each other and from the core member 26. When in operative position, the portions of members 26 carrying the coils 27 are preferably vertically disposed. Adjacent its lower end, each of the members 26 is provided with a binding screw 28 for the attachment of conducting wires. A portion of each of the members 26 above the coil 27 is extended toward the end of the upper leg of the core 1 to which the member 26 is connected, and has an upwardly extending portion 29 opposite such end of the upper leg of core 1. The upwardly extending portion 29 of each core member 26, has threaded into it, a screw-threaded member 30 having a knurled head 31. On each of the screw-threaded members 30, is mounted a locking member or nut 32 provided with a handle 33 to facilitate the operation thereof. Each pair of coöperating core members 1 and 26, with their respective coils 6 and 27, may either be considered as two distinct electro-magnets; or all the cores 1 and the core members 26 connected therewith may be considered as a unitary core structure comprising a main portion and a plurality of branches extending from the main portion, the said main portion having a single energizing coil 6 and each of said branches having an energizing coil 27. The coil 6 is adapted to be energized by an alternating current, preferably the alternating current to be rectified, for producing an alternating magnetic flux in the cores 1, and each of the coils 27 is adapted to be connected to a source of direct current, preferably the storage battery or other device to be supplied with the rectified current, for polarizing the core members 26, in a constant direction. As above stated, the lower ends of the cores 1 and core members 26 are preferably hingedly connected, and, when the core members are in operative position, as shown in Fig. 1, the upturned portions 29 thereof and the ends of the upper legs of cores 1, on which the contact carrying members 14 are mounted, are respectively opposed and slightly spaced apart to form small air gaps. In these air gaps the soft iron armatures 35, elongated and preferably comparatively flat, are located, the said armatures 35 being pivotally mounted at their lower ends, preferably on the pins or bolts 34 which are supported in the core members 26.

It will, therefore, be apparent that each of the armatures 35 is included in the magnetic circuits respectively produced by one of the cores 1 and coil 6, and one of the core members 26 and its coil 27, and will be affected by the magnetic flux of each of such circuits. Each of the armatures 35 has a contact portion 36 at its upper end and is so located as to make and break contact with the adjacent contact 16 in its vibration. The screw-threaded members 30, which are preferably of non-magnetic material serve as back stops for the armatures 35. Each of the armatures 35 is provided, near its pivot, with a binding screw 37 to which is connected a conducting wire or "pigtail" 38, the latter also being connected to one of the core members 26 adjacent the lower end thereof by the binding screw 28. As indicated in Fig. 1, either of the core portions 26, together with its coil 27 and the armature 35 carried thereby, may be swung on its pivot 3, after removing the pin or screw 4, out of operative position in order to enable the operator to examine and clean or adjust the contacts and other parts which are rendered accessible by so swinging the member 26 into inoperative position.

Figure 5:
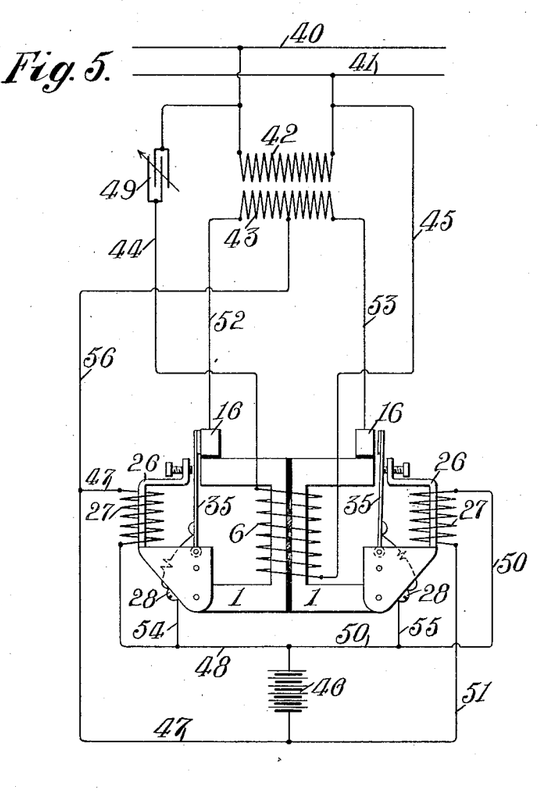
Fig. 5 is a diagrammatic view of an alternating current rectifying system, including my improved two-unit rectifier, for utilizing both half waves of alternating current.

In the system shown in Fig. 5, reference characters 40 and 41 represent the mains of an alternating current circuit, across which is connected a transformer primary 42. Across the terminals of primary 42 is connected, by means of conductors 44 and 45, the coil 6 of a two-unit rectifier, such as has been described above. A storage battery which is to be charged, is shown at 46. Across the terminals of the storage battery 46 is connected, by means of conductors 47 and 48 and conductors 50 and 51 respectively, the coils 27 of the two core members 26. The terminals of the transformer secondary 43 are respectively connected to the two contacts 16 by conductors 52 and 53. The two binding screws 28 of the rectifier are each connected to one terminal of the storage battery by conductors 54 and 48 and conductors 55 and 50 respectively, the other terminal of the storage battery being connected to the middle point of the transformer secondary 43 by conductors 47 and 56. The coils 27 are each energized by direct current from the battery 46 and consequently the core members 26 are each polarized in a constant direction. The coils 27, however, are so wound and connected as to polarize the respective core members 26 in opposite directions. For the purposes of illustration, it will be assumed that the left hand core member 26 in Fig. 5 is polarized in such a direction as to produce a north pole at its upper end, while the right hand core member 26 is polarized in such a direction as to produce a south pole at its upper end. The operation of one of the units of the rectifying device in the system shown in Fig. 5, for example, the left hand unit, may be briefly described as follows: Under the conditions assumed, the magnetic flux in the core member 26 would tend to polarize the upper end of armature 35 as a south pole. The cross section of the iron in the core member 26 and in the armature 35 is preferably small as compared with the cross section of the iron in the core 1, the apparatus being so designed that the core member 26 is magnetically saturated by very little current flowing through coil 27, which may be accomplished by having a large number of turns of wire in the coil 27. There is, therefore, practically no increase in the magnetic flux in the core member 26 when the battery voltage rises to its highest value during charge. The core 1, being energized by the coil 6 connected with the alternating current, has an alternating magnetic flux produced in it of sufficient value to neutralize and overcome the flux produced in the armature 35 by the core member 26 having the direct current coil 27. When the flux in the core 1 falls to zero, the upper end of armature 35 will be rendered a south pole and attracted by the upper end of the core member 26 which is always magnetized, and thereby the contact between contact portion 36 and contact 16 is broken. If the succeeding half wave of the alternating current is in such a direction as to produce a north pole in the upper end of the core 1, the upper end of the armature 35 will remain of south polarity and the armature will remain in open position, because the air gap between the core 1 and the upper end of the armature 35 is too great to permit the armature 35 to be pulled into contact closing position in opposition to the magnetic effect exerted thereon by the upper end of core member 26. The succeeding half wave will render the upper end of the core 1 a south pole and change the polarity of the upper end of the armature 35 from south to north, which will cause the armature 35 to be attracted by the upper end of core 1 and repelled by the upper end of core member 26, which is always a north pole, and thereby effect the closing of the battery charging circuit controlled by the left hand unit by bringing contact portion 36 into engagement with contact 16. As a result, this circuit is closed during every other half wave and remains open during the remaining half waves. The operation of the right hand unit of the rectifying device in the system shown in Fig. 5 is the same as that of the left hand unit just described, except that, due to the fact that the core member 26 of this unit is polarized in such a direction as to render the upper end thereof always a south pole, the contact 16 and contact portion 36 of this unit will be in engagement when the contact 16 and contact portion 36 of the left hand unit are in open position and vice versa. The battery charging circuit controlled by the right hand unit will, therefore, be closed during the half waves the battery charging circuit controlled by the left hand unit is open and vice versa.

During one half wave of alternating current, when the battery charging circuit controlled by the left hand unit of the rectifying device of the system in Fig. 5 is closed, the charging current flows over the following circuit: Starting at the middle point of transformer secondary 43, through conductors 56 and 47, storage battery 46, conductors 48 and 54, and binding screw 28, armature 35 and contact 16 of the left hand unit, to the conductor 52 and one terminal of the transformer secondary 43. At this time, the battery charging circuit controlled by the right hand unit is open and no current flows through the circuit. A half wave later the charging current flows over the following circuit: From the middle point of transformer secondary 43 through conductors 56 and 47, storage battery 46, conductors 50 and 55, and binding screw 28, armature 35 and contact 16 of the right hand unit of the rectifier, to conductor 53 and the other terminal of the transformer secondary 43. At this time the battery charging circuit controlled by the left hand unit is open and no current flows through this circuit. In this manner uni-directional current is supplied to the battery 46 during successive half waves of alternating current. The function of the adjustable condenser 49, in circuit with the alternating current coil 6, is to advance the phase of the current in the coil in order to compensate for the retardation due to the inductance of the coil 6 and for the inertia of the armatures 35, and to cause the battery charging circuits to be broken at the proper times to prevent sparking and to secure the greatest efficiency.

Inasmuch as the polarity of the battery controls the energization of the direct current coils and insures current being supplied to the battery in the proper direction, it is unnecessary to exercise caution in connecting the battery terminals to my improved rectifying device. Furthermore, in case of failure of current in the alternating current circuit or upon abnormal drop in voltage therein, the battery charging circuits are automatically opened and there can be no back discharge from the battery. Therefore, in systems including my improved rectifier, it it unnecessary to employ auxiliary cut-out switches to prevent such back discharge upon such failure of the alternating current or abnormal drop of voltage therein.

Figure 6:
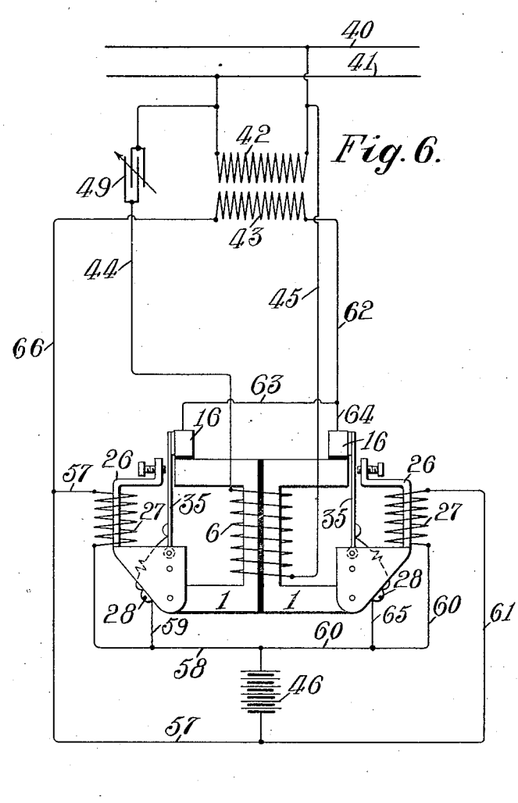
Fig. 6 is a diagrammatic view of a rectifying system, including my two-unit rectifier, for utilizing only alternate half waves of the alternating current, the two units of the rectifier being connected in parallel in the charging circuit.

In the system shown in Fig. 6 the contacts of the units of my improved two-unit rectifier are connected in parallel in a single circuit for supplying uni-directional current to a storage battery, and the two armatures 35 operate simultaneously to open and close such circuit. As connected in this system the rectifying device will have a large current-carrying capacity. In this system the coil 6 of the rectifier is connected across the terminals of transformer primary 42 by conductors 44 and 45 and the coils 27 are connected across the terminals of the battery 46 by conductors 57 and 58 and conductors 60 and 61 respectively, the coils 27 being so wound and connected as to polarize both core members 26 in the same direction. One terminal of the transformer secondary 43 is connected to both contacts 16 by means of conductor 62 and its branches 63 and 64. The binding screws 28 are connected to one terminal of battery 46 by conductors 59 and 58 and conductors 65 and 60 respectively. The other terminal of the battery is connected to the other terminal of the transformer secondary 43 by conductors 57 and 66.

The operation of the system just described is as follows: As both core members 26 are polarized in the same direction, the upper ends thereof will constitute like poles and the alternating magnetic flux in the cores 1 will render the upper ends of both armatures 35 south poles at the same time and north poles at the same time. Consequently, the vibrations of the two armatures 35 toward and from the respective contacts 16 will exactly correspond. During one half wave of alternating current the armatures 35 will be in engagement with the respective contacts 16 and the battery charging circuit will be closed, as shown in Fig. 6. The charging current then flows over the following circuit: From one terminal of transformer secondary 43 through conductor 62, then dividing and flowing through the branches 63 and 64, contacts 16, armatures 35, binding screws 28 and conductors 59 and 58 and conductors 65 and 60 respectively to one terminal of the battery 46, then through the battery, to the conductors 57 and 66 and the other terminal of the secondary 43. During the succeeding half wave the armatures 35 are out of engagement with contacts 16 and the battery charging circuit is open.

It will be apparent that my improved two-unit rectifier may also be readily connected in a system for utilizing only alternate half waves of alternating current and with the units of the rectifier connected in series in the battery or other charging circuit. Such an arrangement would render the rectifier capable of rectifying alternating currents of relatively high voltage, as there would be a plurality of breaks in series in the rectifier.

Figure 7:
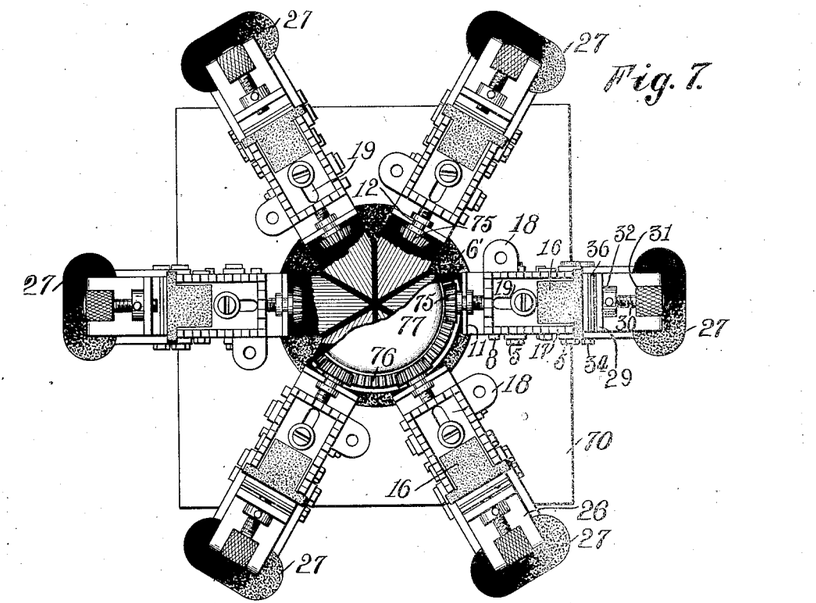
Fig. 7 is a plan view, partly broken away, of a six-unit rectifier in accordance with my invention.
Figure 8:
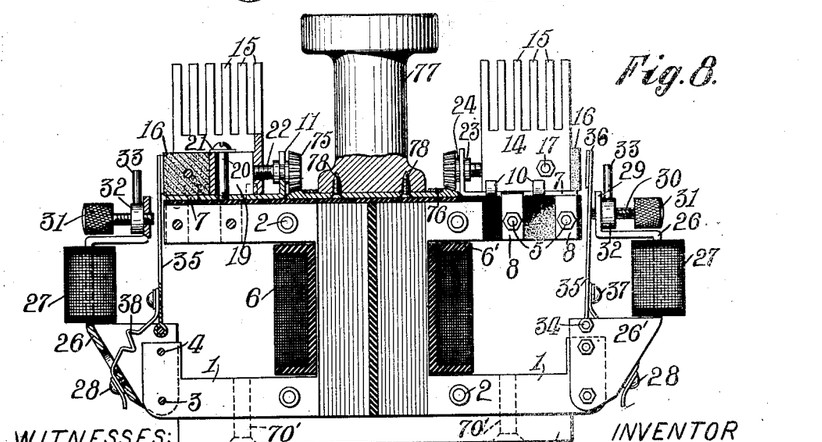
Fig. 8 is a side elevation of the rectifier shown in Fig. 7, shown partly in section and with parts omitted.

In Figs. 7 and 8, I have shown a six-unit rectifier, the units of which are preferably almost exactly like those of the two-unit rectifier hereinbefore described. All the cores 1 of the units are preferably suitably insulated from each other. As in the two-unit rectifier of Figs. 1 and 2, the insulating member 6' of the coil 6 is preferably molded about the cores 1. All the units are thus held together to form a unitary structure and are also further secured together by a heavy base 70, formed of any suitable insulating material, such as slate, and to which the units are suitably connected, as by screws or bolts 70'. The inner ends of the adjusting members 22, for adjusting the contact carrying members 14 and contacts 16, are provided with bevel gears 75 instead of pinions, as in the two-unit rectifier. Engaging all of the bevel gears 75, is a large bevel gear 76 which rests on suitable insulation, carried by the upper surfaces of the cores 1 of the units, and which is held in position by the upstanding portions 11 of members 7. Bevel gear 76 is suitably secured, as by screws 78, to an upwardly extended handle 77. The turning of handle 77 will cause bevel gear 76 to turn bevel gears 75, and thereby screw-threaded members 22, to simultaneously adjust contacts 16 toward or away from armatures 35 according to the direction in which the handle is turned.

The six-unit rectifying device shown in Figs. 7 and 8 may be employed in various rectifying systems, and, in Figs. 9 to 12, several of such systems are shown.

Figures 9, 10, 11, 12, 13:
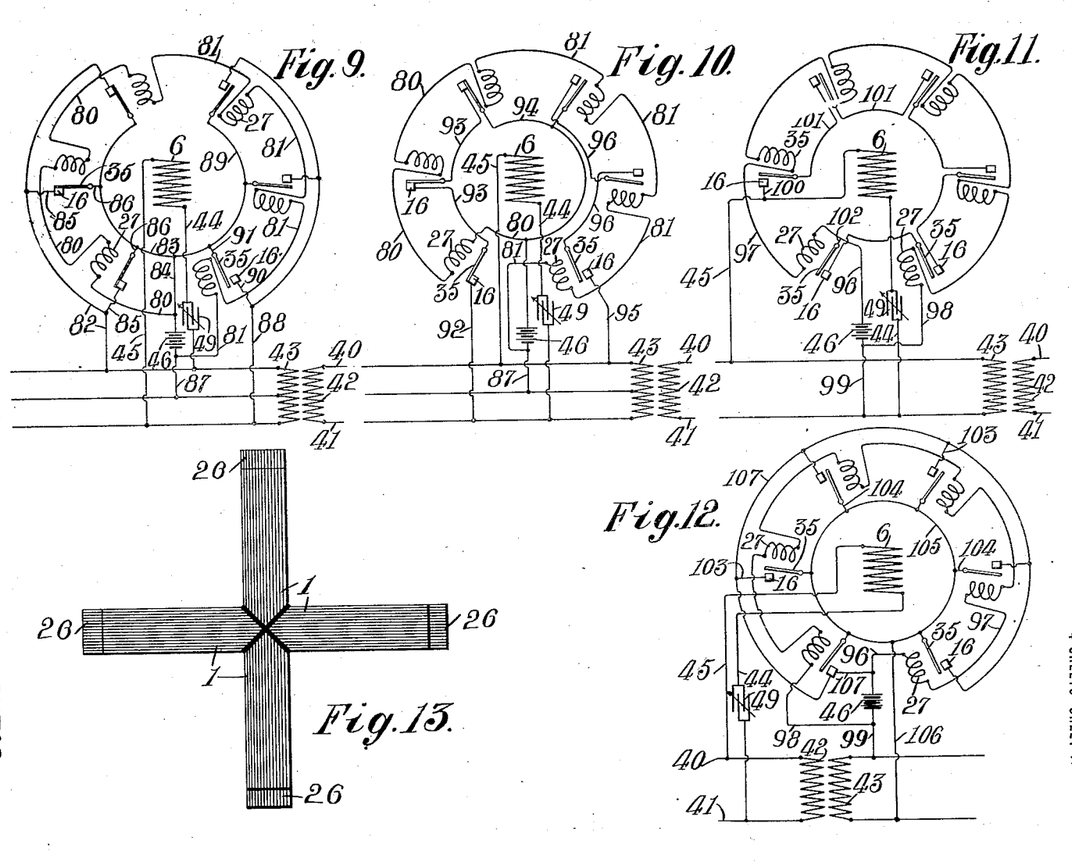
Fig. 9 is a diagrammatic view of an alternating current rectifying system, including my improved six-unit rectifier, for utilizing both half waves of alternating current, two groups of three units each, of the rectifier, being respectively connected in parallel in the battery charging circuits.
Fig. 10 is a diagrammatic view of a rectifying system, including my six-unit rectifier, for utilizing both half waves of alternating current, two groups of three units each of the rectifier, being respectively connected in series in the battery charging circuits.
Fig. 11 is a diagrammatic view of an alternating current rectifying system, including my six-unit rectifier, for utilizing only alternate half waves of alternating current, all the units of the rectifier being connected in series in a single battery charging circuit.
Fig. 12 is a view similar to Fig. 10, showing all the units of the rectifier connected in parallel in the battery charging circuit.
Fig. 13 is a diagrammatic plan view of a four-unit rectifier in accordance with my invention.

Fig. 9 shows a system for utilizing both half waves of alternating current in which the contacts of two groups of three units each of my six-unit rectifier are respectively connected in parallel in two battery charging circuits, whereby an alternating current of relatively high amperage may be efficiently rectified without causing any appreciable sparking in the rectifying device. In the system shown in this figure, the energizing coil 6 for the cores 1 is connected across the mains of the alternating current circuit by conductors 44 and 45. The coils 27, of the three units comprising one of the groups, and the coils 27, of the three units of the other group, are connected across the terminals of the storage battery 46 by conductors 80 and 81 to produce a uni-directional flux in each of the core members 26. The windings 27 of the two groups of units are so arranged and connected, however, that the core members 26 of one group are polarized in a direction opposite to that in which the core members of the other group are polarized. One terminal of the battery 46 is connected by conductor 87 to the middle point of the transformer secondary 43. The contacts 16 and armatures 35 of one group of units of the rectifier are connected in parallel in one battery charging circuit by means of conductor 82 connected to one terminal of the secondary 43, conductors 83 and 84 connected to the other terminal of battery 46, and branches 85 and 86 extending from conductors 82 and 83 respectively, and respectively connected to contacts 16 and armatures 35. The contacts 16 and armatures 35 of the other group of units are connected in parallel in another battery charging circuit by conductor 88 connected to the other terminal of the secondary 43, conductors 89 and 84, and branches 90 and 91 extending from conductors 88 and 89 respectively, and respectively connected to the contacts 16 and armatures 35 of this group.

The operation of the system shown in Fig. 9 may be briefly described as follows: During one half wave of alternating current, one of the battery charging circuits will be open and the other battery charging circuit will be closed. At this time the charging current will flow through the latter circuit to the battery. A half wave later the circuit which was closed, during the preceding half wave, will be open and the other circuit will be closed, and the charging current will now flow through the latter circuit. The flow of current through the battery will be in the same direction during both half waves.

Fig. 10 shows a system for utilizing both half waves of alternating current in which the contacts of two groups of three units each, of my six-unit rectifier, are respectively connected in series in two battery charging circuits, whereby the rectifying device will operate efficiently on alternating current of relatively high voltage without appreciable sparking. In the system shown in this figure, the coil 6 of the rectifier is connected across the mains of the alternating current circuit and the coils 27 of the two groups of units are connected across the terminals of battery 46 in the same manner as in the system shown in Fig. 9. One terminal of the battery 46 is also connected to the middle point of the transformer secondary 43 by conductor 87. The contacts 16 and armatures 35 of one group of units are, however, connected in series in one of the battery charging circuits by means of conductor 92 connected to one terminal of the secondary 43 and one of the contacts 16, conductors 93, and conductor 94 connecting one of the armatures 35 with the other terminal of the battery 46, and the contacts 16 and armatures 35 of the other group of units of the rectifier are connected in series in another battery charging circuit by a conductor 95, connected to the other terminal of the secondary 43 and to one of the contacts 16, conductors 96, and conductor 94. The operation of the system shown in Fig. 10 is similar to that shown in Fig. 9, except that, when one of the battery charging circuits is closed during one half wave, the charging current flows in a single path through the group of units included in that circuit and, when the other battery charging circuit is closed, the charging current flows in a single path through the other group of units.

Fig. 11 shows a system for utilizing only alternate half waves of alternating current, in which the contacts of all the units of the rectifier are connected in series in a single battery charging circuit, whereby although the battery charging circuit will be closed during only alternate half waves, the rectifier will be capable of operating efficiently on alternating currents of very high voltage. In the system shown in this figure, coil 6 is connected across the mains of the alternating current circuit as in the systems shown in Figs. 9 and 10. The coils 27 are all onnected in series across the terminals of battery 46 by conductors 96, 97, and 98; the coils 27 being so wound and connected as to polarize all the core members 26 in the same direction. One terminal of battery 46 is connected to one terminal of secondary 43 by conductor 99. The contacts 16 and armatures 35 are connected in series between the other terminal of secondary 43 and the other terminal of battery 46 by conductors 45, 100, 101, 102 and 96. The operation of this system is as follows: During one half wave of alternating current the coöperating contacts and armatures 16 and 35 of all the units will be out of engagement and the battery charging circuit will be open. During the succeeding half wave all the coöperating contacts and armatures 16 and 35 will be closed, thereby closing the battery charging circuit, and current will then flow from one terminal of the secondary 43 through conductors 45 and 100, in series through contacts 16 armatures 35 and conductors 101, then through conductors 102 and 96, and battery 46, to conductor 99 and the other terminal of secondary 43.

Fig. 12 shows a system for utilizing only alternate half waves of alternating current, in which the contacts of all the units of the rectifier are connected in parallel in a single battery charging circuit, whereby a plurality of current conducting paths are provided through the rectifier, and a very large current-carrying capacity is thus secured. In the system shown in this figure, coil 6 is connected across the mains of the alternating current circuit, and all the coils 27 are connected in series across the terminals of battery 46, in the same manner as in the system shown in Fig. 11. One terminal of the battery 46 is connected to one terminal of secondary 43 by conductor 99. Contacts 16 and the coöperating armatures 35 are connected in parallel with the other terminal of battery 46 and the other terminal of secondary 43 by conductors 107, 103, 104, 105 and 106. The operation of the system in Fig. 12 is similar to that of Fig. 11, except that, when the battery charging circuit is closed during one half wave of alternating current, current flows from one terminal of secondary 43 through conductors 106 and 105 and then divides and flows in parallel through the respective conductors 104, armatures 35, contacts 16 and branches 103 to conductor 107, then through battery 46 to conductor 99 and the other terminal of secondary 43. During the succeeding half wave, the contacts 16 and armatures 35 are in open position and no current will flow over the charging circuit at this time.

My six-unit rectifier may also be readily employed in a system for utilizing only alternate half waves of the alternating current circuit, with the contacts of the units thereof connected in series-parallel in a single circuit, for supplying uni-directional current to a translating device or devices, whereby current having both relatively high voltage and high amperage may be rectified.

In Fig. 13, I have shown, diagrammatically, a four-unit rectifier, the four cores 1 of which are preferably insulated from each other, and each of which cores 1 is provided with a core member 26. This rectifier is capable of being used in all the ways in which the six-unit rectifier may be used, although for the same size of units, it is incapable of operating on currents of as high voltage and amperage as the six-unit rectifier.

The units of all the rectifiers described herein, are each preferably of substantially the same construction as the rectifier disclosed in my co-pending application, Serial No. 777,807, filed July 8, 1913, and entitled, alternating current rectifiers and rectifying systems. However, if desirable, core members 26 may be made integral with, or otherwise fixed to, cores 1 to thereby form a rigid core structure. Permanent magnets, either pivotally connected with, or fixed to cores 1, may also be used instead of core members 26 and their coils 27.

It is to be understood that my invention is not limited to rectifiers having two, four or six units, but includes rectifiers having any number of units. Where it is desired to rectify alternating currents of considerable amperage and voltage and to utilize both half waves of alternating current, a rectifying system including a multiple-unit rectifier having eight or more units may be employed, with the contacts of groups of units thereof connected in series-parallel in each of the circuits supplying uni-directional current to a translating device or devices.

Under some circumstances, for example, when the contacts of the units of the rectifier are connected in parallel in a single charging circuit, as in the systems shown in Figs. 6 and 12, it is unnecessary to electrically insulate the cores 1 of the rectifier from each other. Accordingly under such conditions, the cores 1 may, if desired, be made integral. It is preferable, however, to electrically insulate cores 1 from each other in order that the rectifier may be readily connected for use in any of the ways hereinbefore described.

The cores 1 of my improved rectifying device may readily be made of standard or uniform size, shape, and magnetic flux capacity, and, as a single energizing coil is used for these cores and a single condenser is employed for the several units of the rectifier, it will be apparent that, when the rectifier is in use, substantially the same magnetic conditions will exist in all of the units thereof, i. e., the units will be "in phase." As the point of magnetic saturation of the core members 26 is very low as compared with that of the respective cores 1, the fact that separate windings 27 are used for the core members 26 will have no effect on the sensitiveness of the rectifier. In fact, the windings 27 and the size and shape of the core members 26 may vary within wide limits without appreciably affecting the operation of the rectifier.

It is to be understood that my invention is not limited to the specific embodiments disclosed herein, but that many changes in the construction and arrangement of parts thereof may be made without any departure from the spirit of my invention and the scope of the appended claims.

Having now described my invention, what I claim as new and desire to protect by Letters Patent is as follows:

1. In an alternating current rectifier, a core structure comprising a main portion and a plurality of branches extending from said main portion, the magnetic flux capacity of each of said branches being substantially less than that of said main portion, said main portion being provided with a single energizing coil and each of said branches being provided with an energizing coil, substantially as described.

2. In an alternating current rectifier, a core structure comprising a main portion and a plurality of branches extending from and connected to said main portion, said main portion being provided with a single energizing coil and each of said branches being provided with an energizing coil, and a plurality of vibratory armatures respectively mounted to vibrate between said branches and said main portion, substantially as described.

3. In an alternating current rectifier, a core structure comprising a main portion provided with a plurality of like poles and a plurality of branches extending from said main portion, the free ends of said branches being respectively opposed to and spaced from said poles of said main portion to form air gaps, and a vibratory armature disposed in each of said air gaps, said main portion being provided with a single energizing coil and said branches being each provided with an energizing coil, substantially as described.

4. In an alternating current rectifier, a core structure comprising a main portion provided with a plurality of like poles and a plurality of branches extending from said main portion, the free ends of said branches being respectively opposed to and spaced from said poles of said main portion to form air gaps, and a plurality of vibratory armatures respectively disposed in said air gaps and respectively mounted on said branches, said main portion being provided with a single energizing coil and said branches being each provided with an energizing coil, substantially as described.

5. In an alternating current rectifier, a core portion having a plurality of like poles, a single energizing coil for said core portion, a plurality of magnets respectively coöperating with said poles, and a plurality of armatures each coöperating with and controlled by but one of said poles and the magnet coöperating therewith, substantially as described.

6. In an alternating current rectifier, a core portion having a plurality of like poles, a single energizing coil for said core portion, a plurality of magnets respectively coöperating with said poles, the magnetic flux capacity of said core portion being substantially greater than that of any of said magnets, and a vibratory armature for each of said poles and the magnet coöperating therewith, substantially as described.

7. In an alternating current rectifying system, a core structure comprising a stationary main portion and a plurality of branches extending from and connected to said main portion, said branches and main portion being provided with a plurality of pairs of opposed spaced poles, means for producing an alternating magnetic flux in said main portion, and means for producing a uni-directional magnetic flux in each of said branches, substantially as described.

8. In an alternating current rectifier, a plurality of electro-magnets having a common energizing coil, the cores of said magnets being electrically insulated from each other, a plurality of magnets respectively coöperating with said electro-magnets, and a plurality of armatures respectively controlled by the pairs of coöperating magnets, substantially as described.

9. In an alternating current rectifier, a plurality of electro-magnets having a common energizing coil, a stationary contact mounted on each of said magnets, a plurality of magnets respectively coöperating with said first magnets, and a plurality of vibratory armatures respectively controlled by the pairs of coöperating magnets, said armatures being provided with contact portions respectively coöperating with said contacts for opening and closing circuits, substantially as described.

10. In an alternating current rectifier, a plurality of electro-magnets having a common energizing coil, a stationary contact adjustably mounted on each of said magnets, a plurality of magnets respectively coöperating with said first magnets, a common vibratory armature for each pair of coöperating magnets, said armatures being each provided with a contact portion respectively coöperating with said contacts for opening and closing circuits, and means for simultaneously adjusting said contacts, substantially as described.

11. In an alternating current rectifier, a plurality of electro-magnets having a common energizing coil, a plurality of magnets respectively coöperating with said electro-magnets, each of said second named magnets having a magnetic flux capacity substantially less than that of the electro-magnet coöperating therewith, and a common armature for each pair of coöperating magnets, substantially as described.

12. In an alternating current rectifier, a plurality of electro-magnets of substantially equal magnetic flux capacities, said magnets having a common energizing coil, a plurality of magnets of substantially equal magnetic flux capacities respectively coöperating with said electro-magnets, and a common armature for each pair of coöperating magnets, the magnetic flux capacity of each of said second named magnets being substantially less than that of the coöperating electro-magnet, substantially as described.

13. In an alternating current rectifying system, a pair of core member sets, means for producing alternating magnetic fluxes in one set of core members in synchronism with the alternating current to be rectified, said means comprising a single energizing coil, embracing all the core members of such set, the other set of core members being of unchanging polarity, one set of core members respectively coöperating with the other set of core members, and a vibratory armature for each pair of coöperating core members, substantially as described.

14. In an alternating current rectifier, a plurality of magnets each provided with a stationary contact adjustably mounted thereon, a plurality of magnets respectively coöperating with said first magnets, a common vibratory armature for each pair of coöperating magnets, said armatures being provided with contact portions respectively coöperating with the stationary contacts for opening and closing circuits, and means for simultaneously adjusting all of said contacts toward and away from said armatures, substantially as described.

15. In an alternating current rectifier, a plurality of pairs of magnets, each of said pairs of magnets being provided with a pair of opposed and spaced poles to form an air gap, and a vibratory armature disposed in each of such air gaps, a plurality of core members, one for each of said pairs of magnets, being provided with and embraced by a common energizing coil, substantially as described.

16. In an alternating current rectifying system, a source of alternating current, a device having uni-directional electromotive force, and a rectifier comprising a plurality of pairs of coöperative magnets, a plurality of core members, one for each of said pairs of magnets, being provided with a common energizing coil, said coil being connected to the source of alternating current, and a plurality of core members, one for each of said pairs of magnets, being provided with energizing means comprising a coil for each of such core members, and connections between each of said last named coils and said device, substantially as described.

17. In an alternating current rectifier, a core structure comprising a plurality of sections, a single energizing coil for all said sections, a plurality of core members respectively coöperating with said sections, and a separate energizing coil for each of said core members, substantially as described.

18. In an alternating current rectifier, a core structure comprising a plurality of sections electrically insulated from each other, a single energizing coil for said sections, a plurality of core members respectively coöperating with said sections, and a separate energizing coil for each of said core members, substantially as described.

19. In an alternating current rectifier, a core structure comprising a plurality of sections, a single energizing coil for said sections, a plurality of core members respectively coöperating with said sections, a separate energizing coil for each of said core members, and a vibratory armature for each of said sections and the core member coöperating therewith, substantially as described.

20. In an alternating current rectifier, a core structure comprising a plurality of sections, a single energizing coil for said sections, a plurality of core members respectively coöperating with said sections, a separate energizing coal for each of said core members, a stationary contact mounted on each of said sections, and a vibratory armature for each of said sections and the core member coöperating therewith, said armatures being provided with contact portions respectively coöperating with said contacts for opening and closing circuits, substantially as described.

21. In an alternating current rectifier, a core structure comprising a plurality of sections, a single energizing coil for said sections, a plurality of core members respectively coöperating with said sections, a separate energizing coil for each of said core members, a stationary contact adjustably mounted on each of said sections, a vibratory armature for each of said sections and the core member coöperating therewith, said armatures being provided with contact portions respectively coöperating with said contacts for opening and closing circuits, and means for simultaneously adjusting said contacts toward and away from said armatures, substantially as described.

This specification signed and witnessed this 22nd day of July, 1913.

JERRY CHESLER.

Witnesses:
WILLIAM A. HARDY,
FREDERICK BACHMANN.

It is hereby certified that in Letters Patent No. 1,182,894, granted May 16, 1916, upon the application of Jerry Chesler, of East Orange, New Jersey, for an improvement in "Alternating-Current Rectifiers and Rectifying Systems," an error appears in the printed specification requiring correction as follows: Page 9, line 74, claim 20, for the word "coal" read *coil;* and that the said Letters Patent should be read with this correction therein that the same may conform to the record of the case in the Patent Office.

Signed and sealed this 28th day of November, A. D., 1916.

[SEAL.]

F. W. H. CLAY,

*Acting Commissioner of Patents.*

Cl. 175—365.